April 19, 1932.  C. R. WEXLER  1,854,533
AUTOMATIC SWITCH FOR CONTROLLING MOTOR VEHICLE CARRIED APPARATUS
Filed Feb. 19, 1930
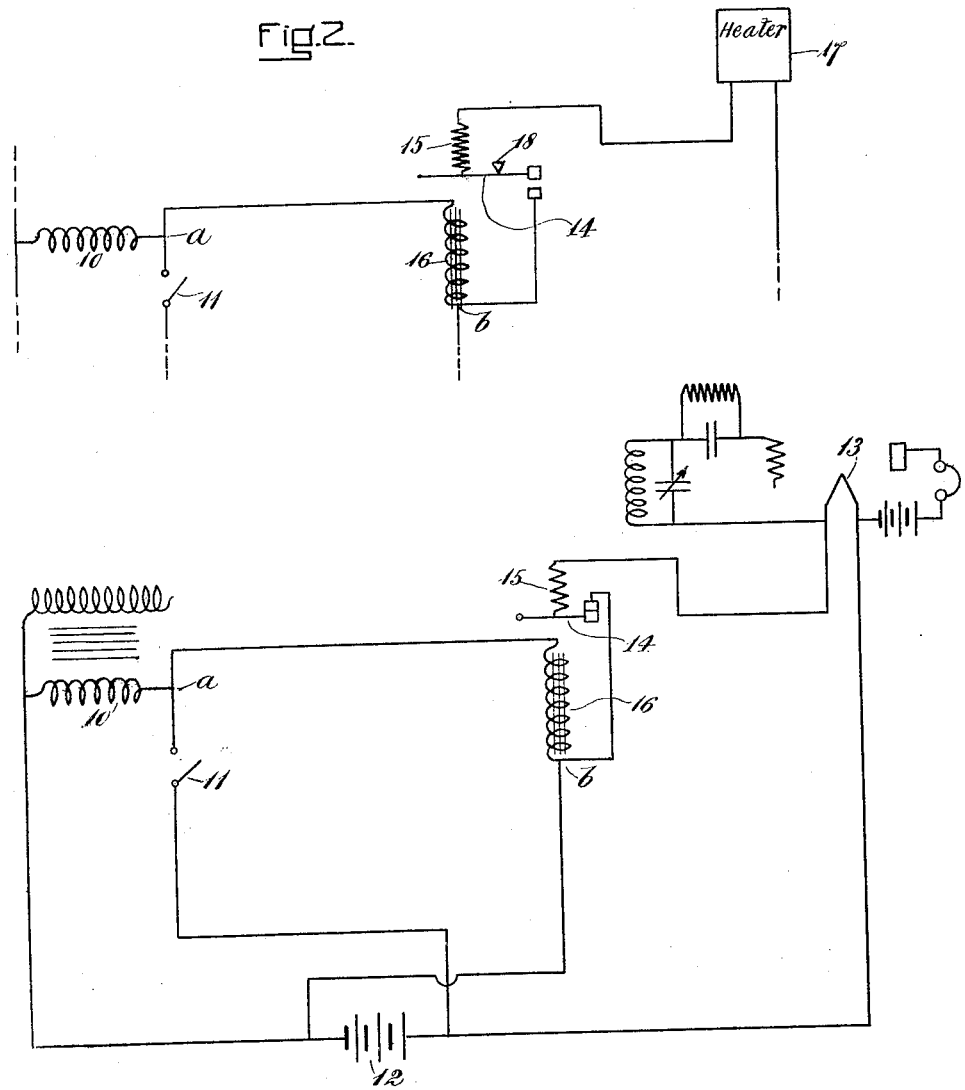

Patented Apr. 19, 1932

1,854,533

UNITED STATES PATENT OFFICE

CHARLES R. WEXLER, OF CAMBRIDGE, MASSACHUSETTS, ASSIGNOR TO DAVID HOUSMAN, OF WINTHROP, MASSACHUSETTS

AUTOMATIC SWITCH FOR CONTROLLING MOTOR-VEHICLE-CARRIED APPARATUS

Application filed February 19, 1930. Serial No. 429,590.

The object of the present invention is to provide means controlled by the switch of the ignition circuit of the motor of an automobile for governing the actuation of an apparatus carried by said automobile, that is to say, either starting or stopping the operation of said apparatus or putting the same in condition to be started by the usual device provided for starting the same, or else rendering it incapable of operation by the actuation of said device. Various devices are carried by automobiles, such for example as electric heaters and radio-receiving sets. In order to prevent the waste of energy my invention is designed, by way of example, to cut off the current from the electric heater when the ignition switch is opened and the motor therefore is not running. Another application of my invention is to control the operation of a radio-receiving set installed in an automobile.

Automobile manufacturers are now marketing motor vehicles provided with radio-receiving sets, the filament circuits of which are energized by the ignition circuit storage battery, and in some jurisdictions the use of such sets on automobiles has been prohibited for the reason that the operation thereof while the car is in motion, tends to distract the attention of the driver and increase the liability of accidents.

By means of the present invention automatic means are provided for preventing the operation of a radio-receiving set when the motor of the vehicle in which the set is installed is running. Manifestly, my invention is not limited to the uses above enumerated, but is capable of more general application and is designed to control the operation of any apparatus carried by an automobile which it is desirable to operate when the motor is running and to stop the operation thereof when the motor is not running, or vice versa.

With the foregoing objects in view, my invention comprises a set of connections and apparatus so constructed and arranged that when the ignition circuit of the motor is closed, a control circuit of the automobile-carried apparatus is closed or is opened according to whether it is desired to operate the apparatus when the motor is running or only when the motor is stopped. In the case of a radio-receiving set installed in a motor vehicle, the arrangement is such that when the ignition circuit of the motor is closed, a control circuit of said receiving set, for example, the filament circuit, automatically is opened.

In the drawings which accompany and form a part of this specification—

Figure 1 is a diagram of one embodiment of my invention representing the control of a radio-receiving set by the ignition switch of the motor of an automobile; and Fig. 2 is a fragmentary diagram showing the application of my invention to the control of an automobile heater by the ignition circuit switch.

It is to be understood that the diagrams are merely illustrative and that they are not to be considered as restrictive.

In the particular diagrams selected for more fully disclosing the principle of my invention, the primary 10 of the ignition coil of the automobile motor is connected through the usual switch 11 to the storage battery 12, and said battery is also included in one of the control circuits of the radio-receiving set, shown in the present instance as the circuit of the filament 13, the filament circuit including also the magnetically-controlled switch 14 which, by means of the spring 15, normally closes said filament circuit when the magnet 16 which actuates said switch is de-energized.

Thus it will be seen that the control circuit of the motor and the control circuit of the receiving set are provided with a common battery. Shunted across said circuits between the points $a$ and $b$ is a circuit including the magnet 16 which actuates said circuit closer. The arrangement is such that when the ignition switch 11 is open and the motor therefore is incapable of running, the filament or other control circuit of the radio set is maintained closed by the switch 14, and that when the switch 11 is closed and the motor either is running or capable of running, there is a circuit from the battery through said shunt including the magnet 16, which results in the energization of said magnet and the consequent opening of the filament circuit.

It is to be understood of course that my invention contemplates the automatic opening of any circuit, designated a control circuit, of the radio set, the opening of which would render said set inoperative when a control circuit of the motor, the closing of which is necessary for the operation thereof, is closed.

In Fig. 2, 17 represents an electric heater of any suitable form adapted to be installed in a motor vehicle and the connections thereof to the battery 12 and ignition circuit are identical with those shown in Figs. 1, with the exception of the switch 14 which is normally maintained by the spring 15 on its back contact 18 so that the circuit of the heater remains open as long as the ignition circuit is kept open by the switch 11. As soon as said circuit is closed by said switch the magnet 16 is energized and the circuit of the heater is closed by the switch 14.

Various other applications of my invention will readily occur to those skilled in the art without further illustration.

Having thus described illustrative embodiments of my invention without however limiting the same thereto, what I claim and desire to secure by Letters Patent is:

1. The combination with a motor vehicle, of a radio-receiving set, a common battery for the ignition circuit of the motor of said vehicle and for the filament circuit of said radio-receiving set, a magnetically actuated circuit closer normally closing said filament circuit through said battery when the magnet actuating the same is de-energized, a shunt circuit, including the magnet actuating said circuit closer, across said ignition circuit and said filament circuit, and a switch in said ignition circuit.

2. The combination with a motor vehicle, of an electrical apparatus, a common battery for the ignition circuit of the motor of said vehicle and for the circuit of said electrical apparatus, a magnetically-actuated circuit closer for closing the circuit of said electrical apparatus through said battery, a shunt circuit, including the magnet of said circuit closer, across said ignition circuit and the circuit of said electrical apparatus, and a switch connected in said ignition circuit and also in the circuit of said circuit-closer.

In testimony whereof, I have hereunto subscribed my name this 18th day of February, 1930.

CHARLES R. WEXLER.